(12) United States Patent
Clery et al.

(10) Patent No.: US 12,723,503 B2
(45) Date of Patent: Sep. 1, 2026

(54) MEASURING INFLATABLE PACKER EXPANSION AND WELLBORE DEFORMATION

(71) Applicant: SCHLUMBERGER TECHNOLOGY CORPORATION, Sugar Land, TX (US)

(72) Inventors: Pierre Clery, Bruz (FR); Hugues Dupont, Sugar Land, TX (US); Henri-Pierre Valero, Clamart (FR); Pierre-Yves Corre, Abbeville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/112,253

(22) PCT Filed: Sep. 18, 2023

(86) PCT No.: PCT/US2023/032993

§ 371 (c)(1),
(2) Date: Mar. 16, 2025

(87) PCT Pub. No.: WO2024/059328

PCT Pub. Date: Mar. 21, 2024

(65) Prior Publication Data

US 2026/0085605 A1 Mar. 26, 2026

(30) Foreign Application Priority Data

Sep. 16, 2022 (EP) .................................... 22306366

(51) Int. Cl.
*E21B 47/01* (2012.01)
*E21B 33/127* (2006.01)
*G01D 5/24* (2006.01)

(52) U.S. Cl.
CPC ............ *E21B 47/01* (2013.01); *E21B 33/127* (2013.01); *G01D 5/24* (2013.01)

(58) Field of Classification Search
CPC ..................................................... E21B 33/127
See application file for complete search history.

(56) References Cited

U.S. PATENT DOCUMENTS 3,753,294 A * 8/1973 Attali .................... G01B 7/044 33/735
5,353,637 A 10/1994 Plumb
5,398,755 A 3/1995 Eslinger et al.
2003/0196820 A1 10/2003 Patel (Continued)

OTHER PUBLICATIONS

International Search Report and Written Opinion of International Patent Application No. PCT/US2023/032993 dated on Jan. 4, 2024, 09 pages.

(Continued)

*Primary Examiner* — David Carroll
(74) *Attorney, Agent, or Firm* — Jeffrey D. Frantz

(57) ABSTRACT

An inflatable packer assembly that includes opposing end fittings by which the inflatable packer assembly is installable within a downhole tool string. An inflatable body coupled between the end fittings has an external groove. An elongation sensor is fixed in the external groove. The elongation sensor includes a capacitive element that whose capacitance varies based on elongation of the elongation sensor in response to inflation of the inflatable body.

20 Claims, 6 Drawing Sheets

(56) References Cited

U.S. PATENT DOCUMENTS

| | | | | |
|---|---|---|---|---|
| 2005/0109097 | A1* | 5/2005 | Bogath | E21B 47/01 73/152.49 |
| 2007/0289735 | A1 | 12/2007 | Corre et al. | |
| 2014/0166275 | A1 | 6/2014 | Corre et al. | |
| 2015/0268106 | A1* | 9/2015 | Otaka | G06F 3/0445 73/780 |
| 2017/0138187 | A1* | 5/2017 | Moronkeji | E21B 49/008 |
| 2018/0252100 | A1 | 9/2018 | Ranjan et al. | |
| 2019/0249540 | A1* | 8/2019 | Ito | E21B 47/00 |
| 2025/0334017 | A1* | 10/2025 | Gray | E21B 33/0422 |

OTHER PUBLICATIONS

Extended European Search Report of European Patent Application No. 22306366.0 dated on Feb. 9, 2023; 07 pages.

Office Action of European Patent Application No. 22306366.0 dated on Nov. 25, 2024; 04 pages.

* cited by examiner

MEASURING INFLATABLE PACKER EXPANSION AND WELLBORE DEFORMATION

CROSS REFERENCE PARAGRAPH

This application is a National Stage Entry of International Patent Application No. PCT/US2023/032993, entitled "MEASURING INFLATABLE PACKER EXPANSION AND WELLBORE DEFORMATION," filed Sep. 18, 2023, which claims the benefit of European Non-Provisional application Ser. No. 22/306,366.0, entitled "MEASURING INFLATABLE PACKER EXPANSION AND WELLBORE DEFORMATION," filed Sep. 16, 2022, the disclosure of which is hereby incorporated herein by reference.

BACKGROUND OF THE DISCLOSURE

Hydrocarbon fluids such as oil and natural gas are obtained from a subterranean geologic formation, also referred to as a reservoir, by drilling a well that penetrates the reservoir. Downhole tool strings containing inflatable packer assemblies may be conveyed within the well to perform various downhole intervention operations. For example, a packer tool conveyed downhole may include a plurality of inflatable packer elements expanded against the surrounding wellbore wall to isolate a region of the wellbore. Such regional isolation can be used in a variety of well related applications, including production applications, service applications, and testing applications.

In some applications, straddle packer tools are used to isolate specific regions of the wellbore to allow collection of fluid samples. Straddle packer tools employ a dual packer configuration in which fluids are collected between two separate packer bodies of the same packer tool. However, the straddle packer configuration is susceptible to mechanical stresses which limit the expansion ratio and the drawdown pressure differential that can be employed. Additionally, irregular shaped wellbores (e.g., comprising an oval profile, cracks, cavities, etc.) can impart additional mechanical stresses to a packer body, limiting operational life of the packer body or causing the packer body to fail. Irregular shaped wellbores may also cause a packer body to expand improperly and form an incomplete seal against the sidewall of the wellbore and, thus, incompletely seal (or isolate) the annular space. Such malfunctions may cause formation fluid flow from different zones to undesirably mix, be produced at the surface, or both. However, existing straddle packers do not provide an operator at the wellsite surface with sufficient information regarding degree of expansion of each packer body or downhole parameters (e.g., shape) of the wellbore.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an inflatable packer assembly that includes opposing end fittings by which the inflatable packer assembly is installable within a downhole tool string, an inflatable body coupled between the end fittings and having an external groove, and an elongation sensor fixed in the external groove. The elongation sensor includes a capacitive element that whose capacitance varies based on elongation of the elongation sensor in response to inflation of the inflatable body.

The present disclosure also introduces a method of manufacturing an inflatable packer assembly, including fixedly installing an elongation sensor in an external groove of an inflatable body. The inflatable body is for coupling between opposing end fittings by which the inflatable packer assembly is installable within a downhole tool string. The elongation sensor includes a capacitive element that whose capacitance varies based on elongation of the elongation sensor in response to inflation of the inflatable body.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figures 1, 2, 3:
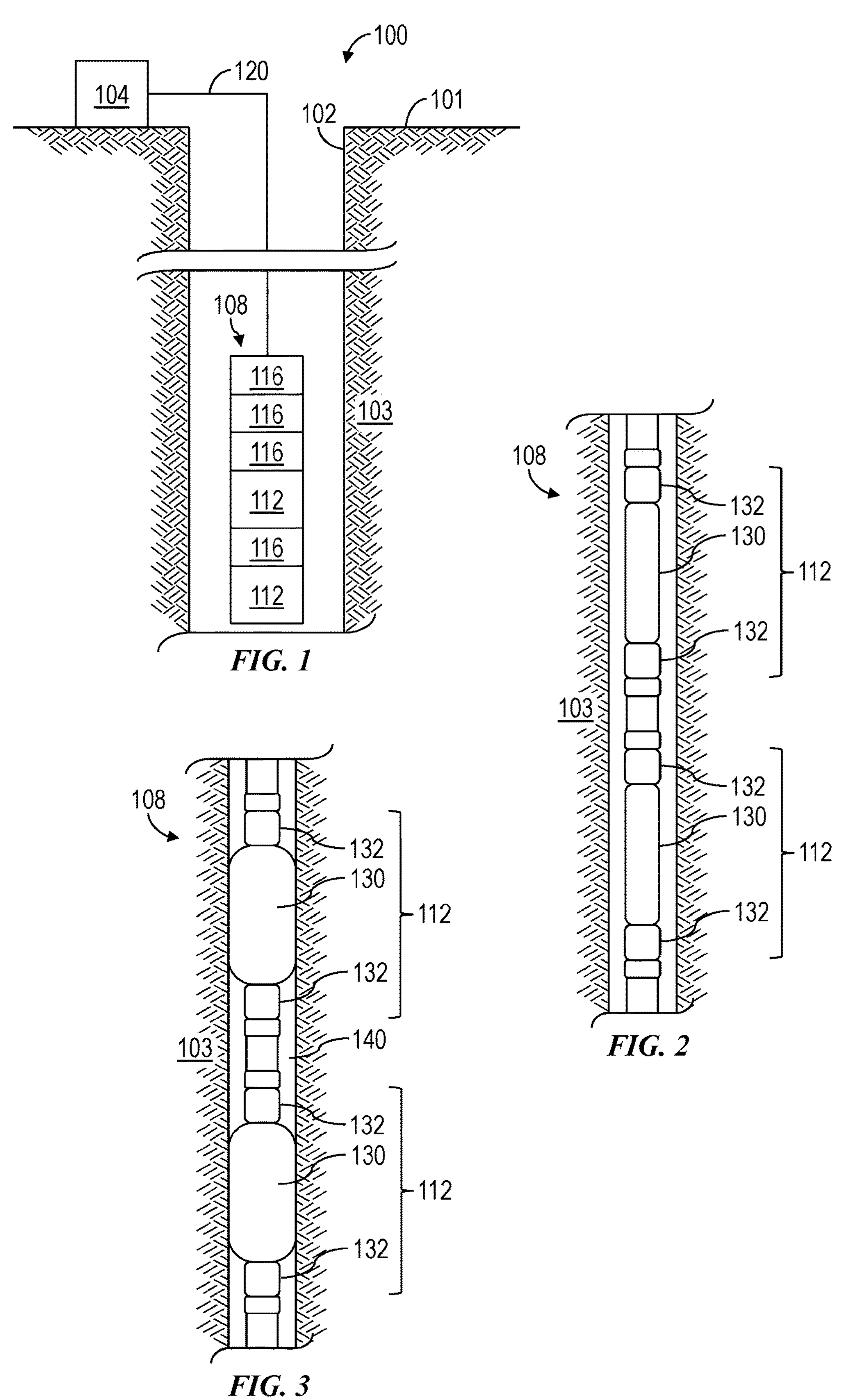
FIG. 1 is a schematic view of at least a portion of apparatus according to one or more aspects of the present disclosure.
FIG. 2 is a schematic view of at least a portion of apparatus according to one or more aspects of the present disclosure.
FIG. 3 is a schematic view of the apparatus shown in FIG. 2 in a different stage of operation.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

FIG. 1 is a schematic view of a portion of an example implementation of a well system 100 comprising an interrogation and acquisition system (IAS) 104, located at a wellsite surface 101, and a tool string 108, conveyed within a wellbore 102 that extends from the wellsite surface 101 into a subterranean formation 103. The tool string 108 comprises one or more inflatable packer assemblies 112 (or modules), such as may be utilized as a dual-packer assembly (DPA). The tool string 108 may also comprise other tools or modules 116 that may carry sensors, processing devices (e.g., controllers), samplers, and/or other downhole tools for assessing the subterranean formation 103, the wellbore 102, and/or fluid within the wellbore 102, whether in conjunction with the one or more packer assemblies 112 or otherwise. The tool string 108 is communicatively coupled to the IAS 104 by one or more electrical and/or fiber optic communication conductors of a wireline cable or other conveyance means 120 suspending the tool string 108 in the wellbore 102. The portions of the wellbore 102 at which the one or more packer assemblies 112 are utilized may be open-hole or at least partially cased (not shown).

The inflatable packer assemblies 112 generally are made of a cable reinforced elastomeric material that can withstand high inflation pressures (e.g., up to 830 bar). In FIG. 1, the tool string 108 comprises two packer assemblies 112, although in other implementations also within the scope of the present disclosure the tool string 108 may include just one packer assembly 112 or more than two spaced apart packer assemblies 112.

FIGS. 2 and 3 are schematic views of a portion of an example implementation of the tool string 108 shown in FIG. 1 within the wellbore 102 during different stages of operation of the tool string 108. As shown in FIG. 2, the tool string 108 may be conveyed to a predetermined depth within the wellbore 102, which has been drilled so that it extends from the wellsite surface 101 and penetrates a hydrocarbon producing portion of the formation 103. Each packer assembly 112 may comprise a packer element 130 extending between end fittings 132 for connecting the packer assembly 112 within the tool string 108. The tool string 108 is conveyed within the wellbore 102 with the packer elements 130 in a deflated configuration to reduce friction between the packer elements 130 and the sidewall of the wellbore 102 while the tool string 108 is conveyed along the wellbore 102. As shown in FIG. 3, when the tool string 108 reaches the predetermined depth within the wellbore 102, the packer elements 130 are inflated to contact and seal against the sidewall of the wellbore 102, thereby isolating (or sealing) an interval of interest 140 of the wellbore 102 defined between the packer elements 130. The interval of interest 140 may then be hydraulically pressurized to fracture the formation 103 surrounding the interval of interest 140. Pressurization of the interval 140 during hydraulic fracturing subjects the packer elements 130 to differential pressure that further deforms the packer elements 130 and the formation 103 in the region of the pressurized interval 140.

After the formation 103 is hydraulically fractured, the pressure is bled from the interval 140. As the differential pressure experienced by the packer elements 130 decreases, the packer elements 130 revert to their previous inflated shape. Finally, the packer elements 130 are deflated to the position shown in FIG. 2, permitting the tool string 108 to be moved within the wellbore 102 to the wellsite surface 101 or another position (i.e., depth) within the wellbore 102.

Inflatable packer elements (e.g., packer elements 130) of packer assemblies (e.g., packer assemblies 112) sustain large amounts of deformation (e.g., stretching) as a result of inflation, pressurization of the interval, depressurization of the interval, and then deflation of the packer elements. Packer assemblies within the scope of the present disclosure may be or comprise instrumented packer assemblies comprising one or more sensors operable for monitoring (i.e., providing measurements of) changes of physical characteristics of the packer elements during fracturing operations to determine operational parameters (or status) of the packer elements and/or certain physical characteristics of the formation 103 surrounding the packer elements to evaluate the formation 103. For example, the sensors of the packer assemblies may be operable for measuring deformation of the packer elements, which may be indicative of pressure within the packer elements and/or shape of the formation 103 surrounding the packer elements.

Figure 4:
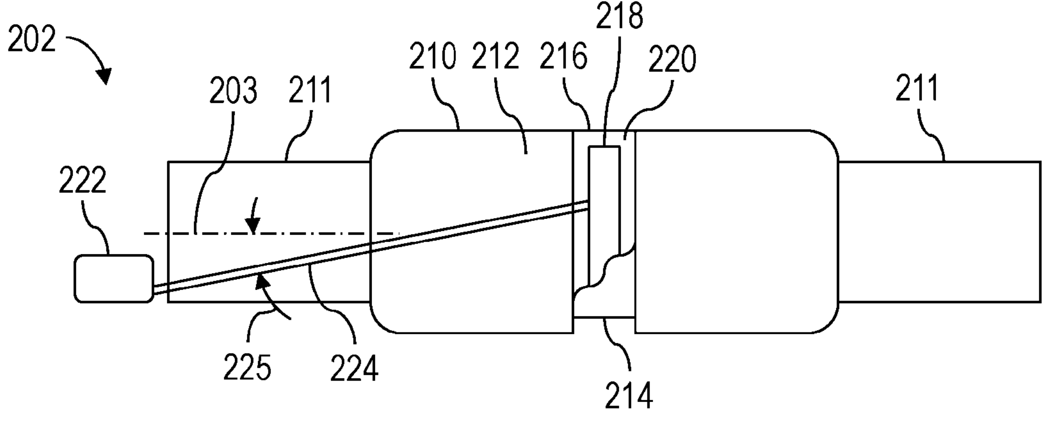
FIG. 4 is a schematic view of at least a portion of apparatus according to one or more aspects of the present disclosure.
Figure 5:
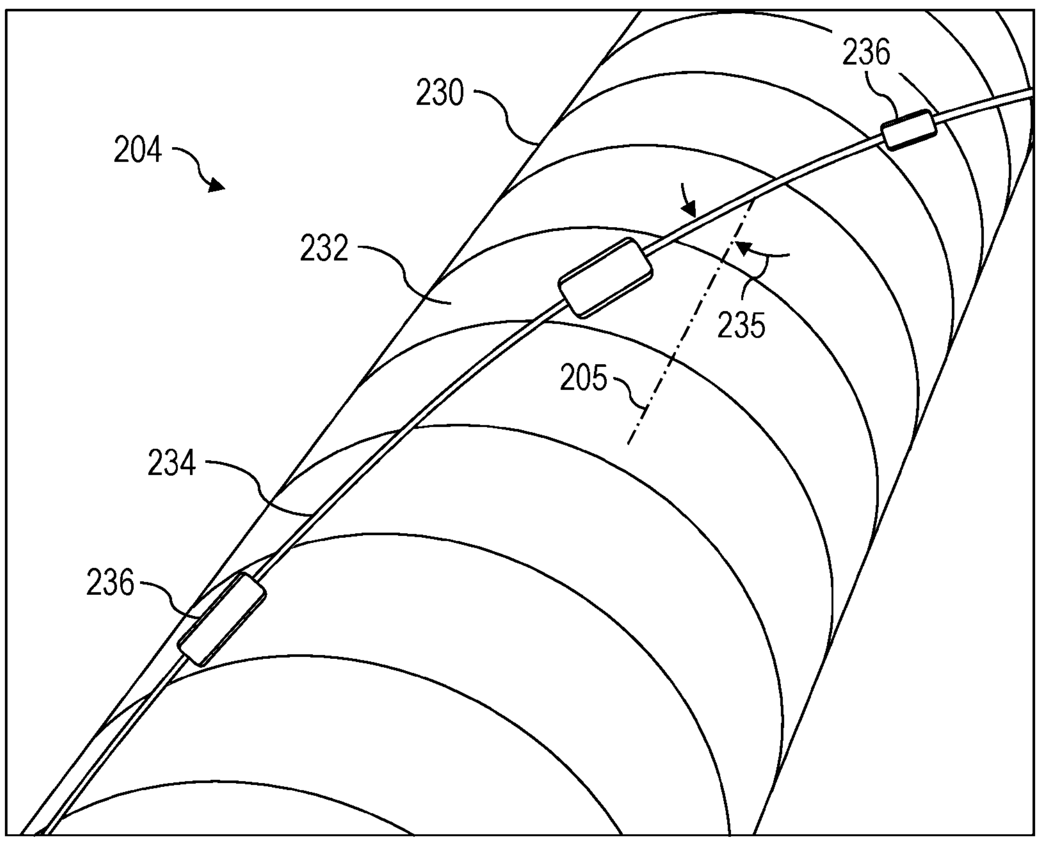
FIG. 5 is a schematic view of a portion of apparatus according to one or more aspects of the present disclosure.

FIGS. 4 and 5 are schematic side and perspective views of at least a portion of example implementations of instrumented inflatable packer assemblies 202, 204, respectively, according to one or more aspects of the present disclosure. The packer assemblies 202, 204 may be or comprise example implementations of the packer assemblies 112 shown in FIGS. 1-3 and may comprise one or more features and/or modes of operation of the packer assemblies 112. Accordingly, the following description refers to FIGS. 1-5, collectively.

The inflatable packer assembly 202 comprises a packer body 210 coupled with and extending between opposing end fittings 211 by which the packer assembly 202 is installable within the downhole tool string 108. The packer body 210 comprises a plurality of outer (or external) and inner (or internal) inflatable or otherwise expandable members, including inflatable elastomeric packer elements (or layers). For clarity and ease of understanding, just a single expandable member 212 is shown. The packer body 210 (including a packer element) may comprise a groove 214 containing a sensor 216 for monitoring (or measuring) deformation of the expandable member 212 of the packer body 210, such as when the packer body 210 is inflated to seal the wellbore interval 140 and when the interval 140 is pressurized. The groove 214 may be an external groove, extending circumferentially along an external surface of the expandable member 212 of the packer body 210. The expandable member 212 may be an outermost expandable member configured to contact the sidewall of the wellbore 102. In such implementation of the inflatable packer assembly 202, the groove 214 may physically protect or otherwise recess the sensor 216 from direct contact with the sidewall of the wellbore 102 while the tool string 108 comprising the packer assembly 202 is being conveyed within the wellbore 102 and/or while the packer body 210 is being expanded, such as when the packer body 210 is inflated and when the interval 140 is pressurized. The groove 214 may facilitate homogenous (or uniform) expansion of the sensor 216 independent of the manner in which packer body 210 expands. For example, the sensor 216 recessed or otherwise disposed within the groove 214 may expand uniformly throughout regardless of whether certain portions of the packer body 210 expand more than other portions of the packer body 210, such as when the wellbore 102 is irregular (e.g., comprises an oval shape) or when the sidewall of the wellbore 102 is uneven (e.g., comprises a cavity). A lubricant can be injected between the sensor 216 and the packer body 210 to decrease friction therebetween and, thus, further facilitate independent relative deformation between the sensor 216 and the packer body 210. The expandable member 212 may instead be an inner expandable member that is covered by one or more outer expandable members configured to contact the sidewall of the wellbore 102. For example, the inflatable packer assembly 202 may comprise an outer expandable member (e.g., an elastomeric sleeve) surrounding (e.g., covering) the expandable member 212 (and the rest of the packer body 210) and the sensor 216 located within the groove 214. The outer expandable member may also surround at least a portion of each end fitting 211.

The sensor 216 may be disposed within the groove 214 and extend circumferentially around the packer body 210 while disposed within the groove 214. In an example implementation, the sensor 216 may have a tubular geometry (e.g., a circular band) configured to accommodate the packer body 210 therethrough, such that the sensor 216 can be disposed within the circumferential groove 214. In another example implementation, the sensor 216 may have a planar geometry (e.g., a rectangular or square strip) configured to be wrapped around the packer body 210 within the circumferential groove 214. In still another example implementation, the groove 214 may extend helically around the inflatable body 210, such as where the sensor 216 may have a planar geometry (e.g., a rectangular or square strip) configured to be wrapped around the packer body 210 within the helical groove 214. In still another example implementation, the inflatable packer assembly 202 may comprise a plurality (e.g., two, three, or more) of sensors 216 disposed within a single circumferential, helical, or other groove 214, as described above. In still another example implementation, the inflatable packer assembly 202 may comprise a plurality of sensors 216 and a plurality of circumferential, helical, or other grooves 214 each containing a corresponding sensor 216, as described above. Each sensor may be removed from a corresponding groove 214 of the packer assembly 202 and reused in (i.e., inserted in a groove of) another packer assembly.

The sensor 216 comprises a capacitive element 218 whose capacitance varies based on physical deformation of the capacitive element 218 as the packer body 210 deforms, such as when the packer body 210 is inflated and when the interval 140 is pressurized. The sensor 216 may further comprise a sensor body 220 (e.g., a matrix, a carrier medium, etc.) covering, enclosing, or otherwise encapsulating the capacitive element 218, such as to protect or otherwise isolate (e.g., physically and/or electrically) the capacitive element 218 from direct contact with the packer body 210 and external environment. In an example implementation, the body 220 may be or comprise a flexible, elastomeric, and non-conductive material. In an example implementation, the sensor 216 may be an elongation sensor, wherein the capacitive element 218 whose electrical capacitance varies based on elongation of the capacitive element 218 of the sensor 216 as the packer body 210 expands circumferentially, such as when the packer body 210 is inflated and when the interval 140 is pressurized. The material forming the capacitive element 218 and/or the sensor body 220 may be or comprise an elastic material that resists deformation (e.g., elongation), such as when the packer body 210 expands, and returns to its non-deformed (e.g., prior, original, etc.) structural state, such as when the packer body 210 is deflated and returns to its retracted state. Thus, the sensor 216 may output a sensor signal indicative of an electrical capacitance that is dependent on (e.g., circumferential) elongation and contraction of the sensor 216 corresponding to a respective amount of inflation and deflation of the inflatable packer body 210. The sensor signal may be an electrical sensor signal communicated to the IAS 104 via electrical conductors of the conveyance means 120. The sensor signal may instead be an optical sensor signal communicated to the IAS 104 via optical (e.g., fiber optic) conductors.

The sensor 216 may be configured to store an electrical charge in an electric field (e.g., similar to an electrical capacitor). The electrical charge may be stored on surface of the capacitive element 218, which may comprise, for example, silicon, polyurethane, nitrile, hydrogenated nitrile, a fluorocarbon-based fluoroelastomer (e.g., FKM, FFKM, etc.) or another deformable (e.g., elastomeric) and electrically conductive material capable of storing an electrical charge. The capacitance (i.e., capacity to store an electrical charge) of the capacitive element 218 may change as the surface area of the capacitive element 218 changes when the capacitive element 218 deforms with the sensor 216 as the packer body 210 deforms. Thus, when the surface area of the capacitive element 218 increases, such as when the packer body 210 is inflated, the electrical capacitance of the sensor 216 may increase, and when the surface area of the capacitive element 218 decreases, such as when the packer body 210 is deflated, the electrical capacitance of the sensor 216 may decrease. The capacitive element 218 may comprise two or more layers of the deformable and electrically conductive material separated by non-conductive (i.e., a dielectric) layers, with opposing surfaces of adjacent conductive layers able to hold opposite electrical charges.

An electronic acquisition module 222 may be electrically and communicatively connected with the capacitive element 218 of the sensor 216 via a plurality of electrical conductors 224 (e.g., a cable). The electrical conductors 224 may extend diagonally (e.g., helically) with respect to a longitudinal (e.g., a central) axis 203 of the packer assembly 202 at an angle 225 with respect to the longitudinal axis 203. The angle 225 is selected such that the angle 225 matches (or mimics) longitudinal shortening and circumferential (or radial) expansion of the packer body 210 when the packer body 210 is inflated. As the packer body 210 is being inflated, the longitudinal (or axial) length of the electrical conductors 224 may decrease as the packer body 210 shortens longitudinally (and the angle 225 increases), and a circumferential (and radial) length of the electrical conductors 224 may increase as the packer body 210 expands circumferentially (i.e., radially). Thus, the angle 225 of the electrical conductors 224 may be selected such that the longitudinal and circumferential changes in length of the electrical conductors 224 cancel out (i.e., are about equal, but opposite), thereby preventing or inhibiting stretching (or compressing) of the electrical conductors 224 when the packer body 210 is being inflated. In an example implementation, the angle 225 may range between about zero (0) and 25 degrees.

The electronic acquisition module 222 may be operable to apply voltage to the capacitive element 218 to build up an electrical charge in the capacitive element 218. For example, each electrical conductor 224 may be electrically connected to a corresponding layer of the deformable and electrically conductive material of the capacitive element 218, thereby permitting the electronic acquisition module 222 to apply a positive and a negative voltage to adjacent layers of the deformable and electrically conductive material to cause an electric charge to build up in the capacitive element 218. The electronic acquisition module 222 may then measure the amount of electrical charge (i.e., electrical capacitance) stored in the capacitive element 218, which may be used to determine the amount of deformation of the packer body 210. For example, the electrical capacitance of the capacitive element 218 while the packer body 210 is deflated (i.e., in its retracted position for downhole conveyance) may be known and used as a baseline. Thereafter, changes in the electrical capacitance of the capacitive element 218, such as when the packer body 210 is inflated and when the interval 140 is pressurized, may be indicative of the amount of deformation (e.g., expansion) of the packer body 210. In an example implementation, the baseline electrical capacitance of the capacitive element 218 may range between about 100 picofarads (pF) and 1000 pF at five (5) volts (V), which can store an electrical charge ranging between about $5\times10^{-10}$ coulombs (C) and $5\times10^{-9}$ C.

In an implementation of the packer assembly 202 comprising a plurality of sensors 216, the capacitive element 218 of each sensor 216 may be electrically connected with the electronic acquisition module 222 in the same or similar manner as described above. The electronic acquisition module 222 may be or form a portion of the packer assembly 202 or another portion of the tool string 108 comprising the packer assembly 202. For example, the electronic acquisition module 222 may be housed within, connected to, or otherwise carried by an end fitting 211 of the packer assembly 202 or other portion of the packer assembly 202 that does not expand, such that the electronic acquisition module 222 is not subjected to mechanical stresses caused by expansion of the packer body 210.

The inflatable packer assembly 204 shown in FIG. 5 comprises one or more features and/or modes of operation of the packer assembly 202 shown in FIG. 4. The packer assembly 204 comprises a packer body 230 coupled with and extending between opposing end fittings (shown in other figures) by which the packer assembly 204 is installable within the downhole tool string 108. The packer body 230 comprises a plurality of outer (or external) and inner (or internal) inflatable or otherwise expandable members, including inflatable packer elements. For clarity and ease of understanding, just a single expandable member 232 is shown. The inflatable packer assembly 204 may comprise one or more sensors 236 for monitoring (or measuring) deformation of the expandable member 232 of the packer body 230, such as when the packer body 230 is inflated to seal the wellbore interval 140 and when the interval 140 is pressurized. The expandable member 232 may be an outer expandable member configured to contact the sidewall of the wellbore 102. The expandable member 232 may instead be an inner expandable member that is covered by one or more outer expandable members configured to contact the sidewall of the wellbore 102. For example, the inflatable packer assembly 204 may comprise an outer expandable member (e.g., an elastomeric sleeve) surrounding (e.g., covering) the expandable member 232 (and the rest of the packer body 230) and the sensors 236.

Each sensor 236 may be disposed on or otherwise connected (e.g., fixed) to the expandable member 232 the packer body 230. For example, each sensor 236 may be fixedly connected to the expandable member 232 of the packer body 230 such that the sensor 236 will expand in two dimensions (i.e., longitudinally and circumferentially), such as when the packer body 230 is inflated and when the interval 140 is pressurized. In an example implementation, each sensor 236 may have a planar geometry (e.g., square, rectangular, circular, etc.) configured to be connected to the expandable member 232 of the packer body 230.

Each sensor 236 may comprise the same or similar structure and/or mode of operation as the sensor 216 shown in FIG. 4. For example, the sensor 236 may comprise a capacitive element whose capacitance varies based on deformation of the capacitive element of the sensor 236 as the packer body 230 deforms, such as when the packer body 230 is inflated and when the interval 140 is pressurized. Each sensor 236 may further comprise a body (e.g., a matrix, a carrier medium, etc.) covering, enclosing, or otherwise encapsulating the capacitive element, such as to protect or otherwise isolate (e.g., physically and/or electrically) the capacitive element from direct contact with the packer body 230 and external environment. In an example implementation, each sensor 236 may be an expansion sensor, wherein the capacitive element capacitance varies based on two-dimensional expansion (or elongation) of the capacitive element of the sensor 236 as the expandable member 232 the packer body 230 expands (or elongates) longitudinally and circumferentially, such as when the packer body 230 is inflated and when the interval 140 is pressurized. The sensors 236 may be distributed at different longitudinal (i.e., with respect to a longitudinal (e.g., a central) axis 205 of the packer assembly 204) positions of the packer body 230 and/or at different azimuthal (or angular) positions of the packer body 230. The longitudinal and azimuthal positions of the sensors 236 may be predetermined with respect to the packer body 230 of the packer assembly 204.

An electronic acquisition module (not shown) may be electrically and communicatively connected with the capacitive element of the sensors 236 via a plurality of electrical conductors 234. Each sensor 236 may be connected to the electronic acquisition module via a same set (e.g., a cable) of electrical conductors 234 or a different set of electrical conductors 234. The electrical conductors 234 may extend diagonally (e.g., helically) with respect to the longitudinal axis 205 of the packer assembly 204 at an angle 235 with respect to the longitudinal axis 205. The angle 235 is selected similarly as described above with respect to the angle 225, such that the angle 235 matches (or mimics) longitudinal shortening and circumferential (or radial) expansion of the packer body 230 when the packer body 230 is inflated. The electronic acquisition module may be operable to apply voltage to the capacitive element to build up an electrical charge in the capacitive element. The electronic acquisition module may then measure the amount of electrical charge (i.e., electrical capacitance) stored in the capacitive element, which may be used to determine the amount of deformation of the packer body 230. For example, changes in the electrical capacitance of the capacitive element, such as when the packer body 230 is inflated and when the interval 140 is pressurized, may be indicative of the amount of deformation (e.g., expansion) of the packer body 230.

Figure 6:
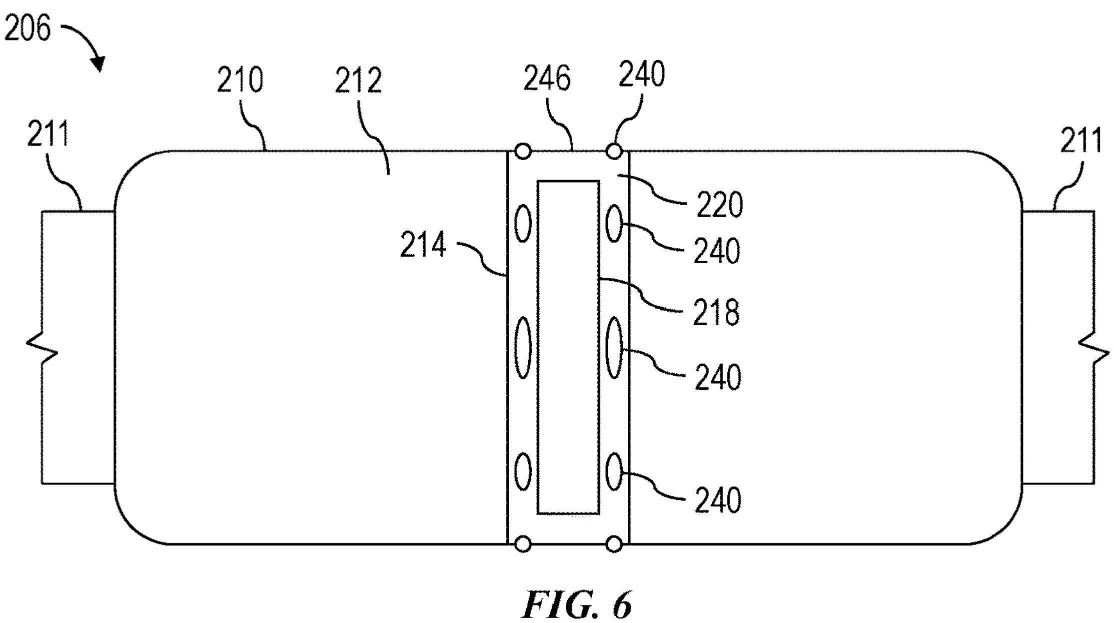
FIG. 6 is a schematic view of at least a portion of apparatus according to one or more aspects of the present disclosure.

FIG. 6 is a schematic side view of at least a portion of an example implementation of an instrumented inflatable packer assembly 206 according to one or more aspects of the present disclosure. The packer assembly 206 may comprise one or more features and/or modes of operation of the packer assemblies 112, 202 shown in FIGS. 2-4, including wherein indicated by the same reference numerals. Accordingly, the following description refers to FIGS. 2-4 and 6, collectively.

The inflatable packer assembly 206 comprises a packer body 210 coupled with and extending between opposing end fittings 211 by which the packer assembly 206 is installable within the downhole tool string 108. The packer body 210 comprises an expandable member 212. The packer body 210 may comprise a groove 214 containing a sensor 246 for monitoring (or measuring) deformation of the expandable member 212 of the packer body 210, such as when the packer body 210 is inflated to seal the wellbore interval 140 and when the interval 140 is pressurized. The sensor 246 may comprise a sensor body 220 (e.g., a matrix, a carrier medium, etc.) covering, enclosing, or otherwise encapsulating a capacitive element 218 of the sensor 246.

The sensor 246 may comprise a plurality of gripping members 240 extending in a radially outward direction from an outer surface of the sensor body 220. The gripping members 240 may be configured to grip, bite into, or otherwise anchor against the formation 103 defining the wellbore 102. The gripping members 240 may comprise passive materials, whether rigid and/or elastomeric, configured to grip the sidewall of the formation 103. The gripping members 240 may instead (or additionally) be biased in the radially outward direction by corresponding springs and/or other biasing means (not shown). The gripping members 240 may prevent or inhibit portions of the sensor 246 from slipping or otherwise moving into irregular (e.g., uneven) portions of the wellbore 102, such as oval portions of the wellbore 102 and/or cavities (e.g., cracks) extending into the sidewall of the wellbore 102 when the packer body 210 is inflated. The gripping members 240 may thus facilitate compliance with formation deformation along the sidewall of the wellbore 102, such as during stress testing or otherwise when the packer body 210 is expanded.

Figure 7:
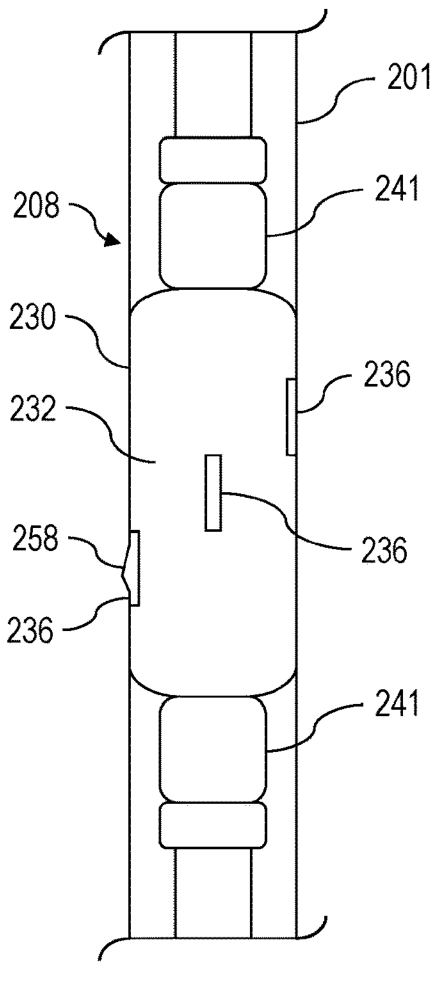
FIG. 7 is a schematic view of at least a portion of apparatus according to one or more aspects of the present disclosure.

FIG. 7 is a schematic side view of at least a portion of an example implementation of an instrumented inflatable packer assembly 208 according to one or more aspects of the present disclosure. The packer assembly 208 may comprise one or more features and/or modes of operation of the packer assemblies 112, 204 shown in FIGS. 2, 3, and 5, including wherein indicated by the same reference numerals. Accordingly, the following description refers to FIGS. 1-3, 5, and 7, collectively.

The inflatable packer assembly 208 comprises a packer body 230 coupled with and extending between opposing end fittings 241 by which the packer assembly 208 is installable within the downhole tool string 108. The packer body 230 comprises an expandable member 232. The packer body 230 may comprise a plurality of sensors 236 for monitoring (or measuring) deformation of the expandable member 232 of the packer body 230, such as when the packer body 230 is inflated to seal the wellbore interval 140 and when the interval 140 is pressurized. The sensors 236 may be distributed at different longitudinal positions of the packer body 230 and/or at different circumferential (or azimuthal) positions of the packer body 230.

When the packer body 230 expands against the sidewall of the wellbore 201, portions of the packer body 230 and sensors 236 disposed against irregular (e.g., uneven) portions of the wellbore 201, such as oval portions of the wellbore 201 and/or cavities (e.g., cracks) extending into the sidewall of the wellbore 201 may be forced radially outward into such irregular portions of the wellbore 201. The portions of the packer body 230 and sensors 236 forced into such irregular portions of the wellbore 201 may experience increased (or additional) amount of deformation (e.g., stretching) 258. Such increased amount of deformation 258 of the sensors 236 may cause an increased amount of deformation of the capacitive element of the sensors 236, causing an additional change (e.g., an increase) in capacitance of the sensor 236 with respect to other sensors 236 that did not experience the increased amount of deformation 258. The additional change in capacitance of the sensor 236 may be indicative of the shape (e.g., depth, width, etc.) of the irregular portion of the wellbore 201. The additional change in capacitance of the sensor 236 may also or instead be indicative of the location (e.g., longitudinal depth and/or azimuthal (angular) location) of the irregular portion of the wellbore 201. Thus, the longitudinal and azimuthal positions of the sensors 236 may be kept track of when the packer assembly 208 is conveyed downhole within the wellbore 201, such as may permit determination of the location of the irregular portion of the wellbore 201.

Figure 8:
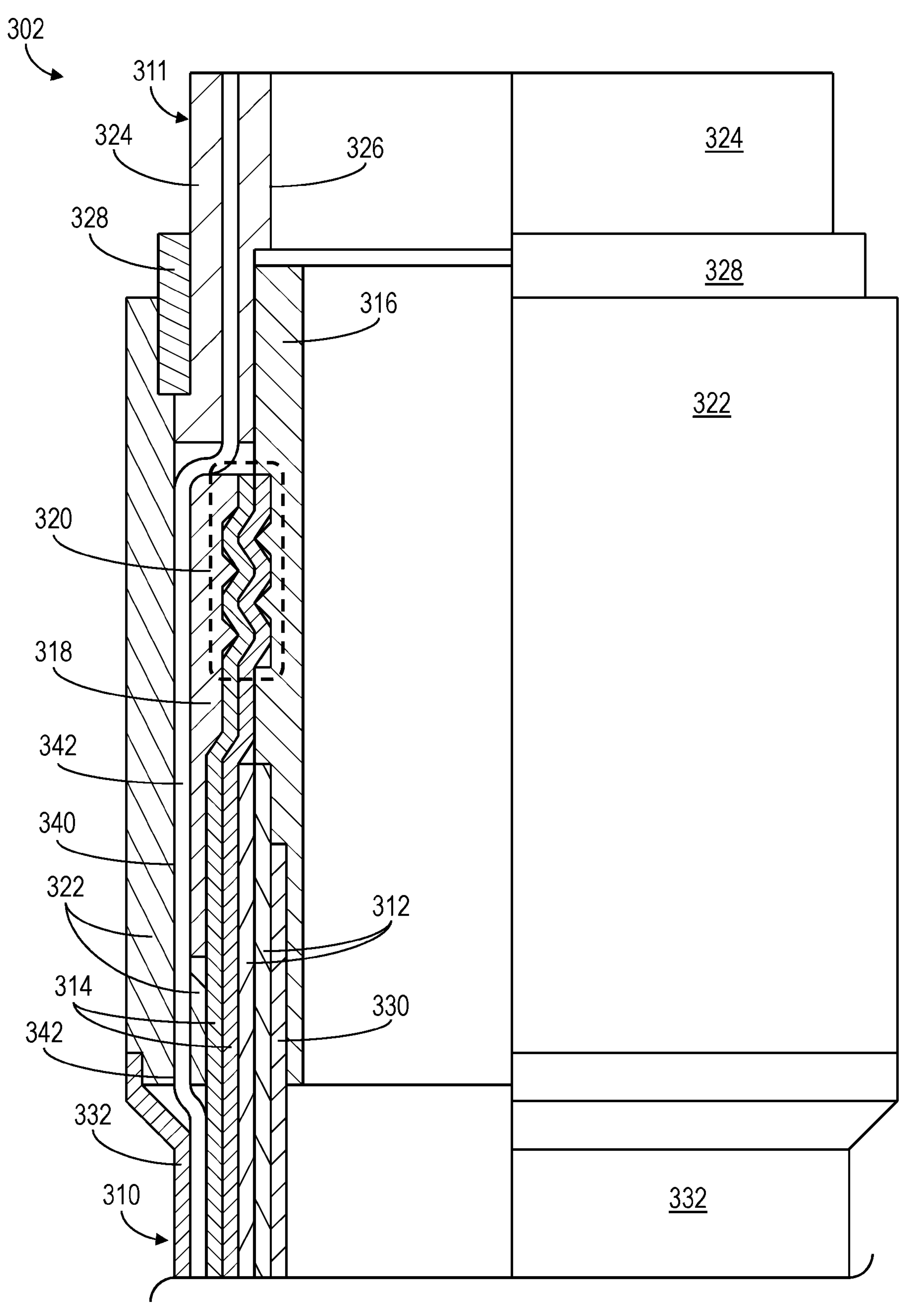
FIG. 8 is a schematic view of a portion of apparatus according to one or more aspects of the present disclosure.

FIG. 8 shows a partial sectional side view of an end fitting 311 and a portion of an inflatable packer body 310 of a packer assembly 302 according to one or more aspects of the present disclosure. The packer assembly 302 may comprise one or more features and/or modes of operation of the packer assemblies 112, 202, 204, 206, 208 shown in FIGS. 1-7. The following description refers to FIGS. 1-3 and 8, collectively.

The packer body 310 may comprise a plurality of expandable inner members 312 (e.g., elastomeric packer elements) and a plurality of reinforcement cables 314 reinforcing the expandable inner members 312 connected to and extending between the end fittings 311. Each end fitting 311 may comprise an internal body 316 to which the reinforcement cables 314 and the expandable inner members 312 may be connected to. For example, a crimping ring 318 may be disposed about and compressed against the internal body 316 to compress and, thus, connect the reinforcement cables 314 and the expandable inner members 312 to the internal body 316. The cables 314 may be compressed between the crimping ring 318 and the internal body 316 within a crimping region 320 of the crimping ring 318 and the internal body 316 configured to bite into and grip the cables 314. An internal tube 330 (or mandrel) may be connected to and extend between the opposing internal bodies 316 and, thus, connect the internal bodies 316. Each end fitting 311 may further comprise an external body 322 (e.g., an injection skirt) disposed around the crimping ring 318 (and the internal body 316). An end connector 324, such as comprising connection threads 326, may be connected to the internal and external bodies 316, 322. The end connector 324 may be retained between and, thus, connected to the internal and external bodies 316, 322 via a retaining ring 328. An expandable external member 332 (e.g., elastic sleeve) may be connected to the external body 322 and cover the cables 314, the expandable inner members 312, and the internal tube 330.

The external body 322 may comprise a bore 340 extending longitudinally therethrough. The bore 340 may accommodate therethrough a plurality of conductors 342 (e.g., a cable) for electrically connecting to a sensor (not shown) for monitoring (or measuring) deformation of the expandable members 312, 332 of the packer body 310, such as when the packer body 310 is inflated to seal the wellbore interval 140 and when the interval 140 is pressurized. The conductors 342 may electrically and communicatively connect the sensor with an electronic acquisition module (not shown). The sensor of the packer assembly 302 may be or comprise one or more of the sensors 216, 236, 246 described herein, and the electronic acquisition module of the packer assembly 302 may be or comprise the electronic acquisition module 222 described herein. The bore 340 may comprise an opening that is located between the expandable members

312, 332 of the packer body 310, thereby facilitating electrical connection between the electronic acquisition module and the sensor without forming a hole through one or more of the expandable members 312, 332.

Figure 9:
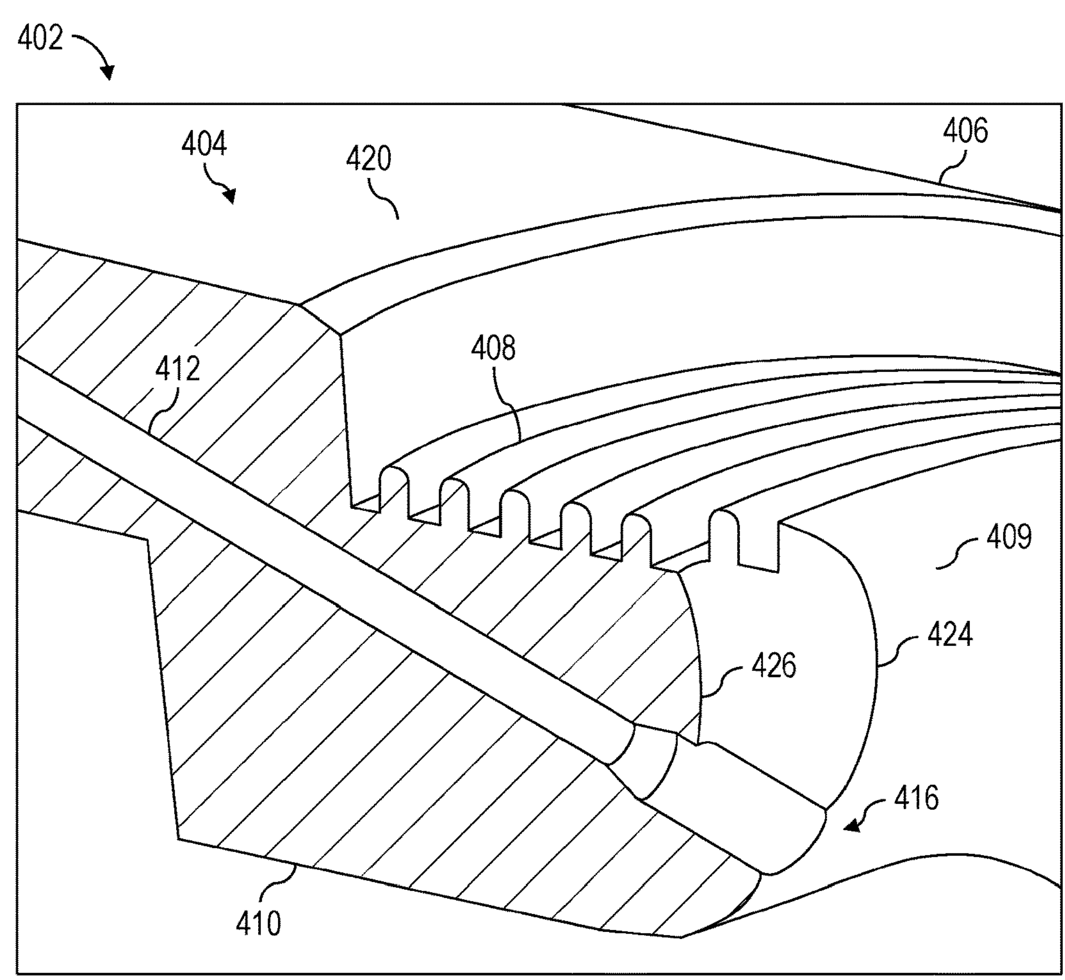
FIG. 9 is a perspective sectional view of a portion of apparatus according to one or more aspects of the present disclosure.
Figure 10:
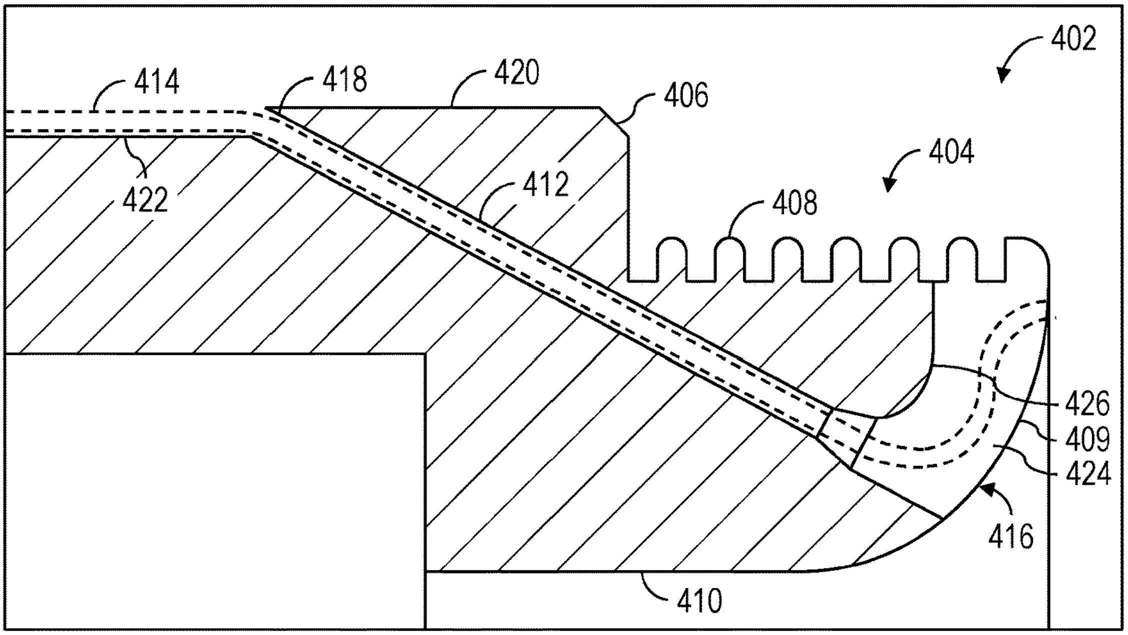
FIG. 10 is a side sectional view of the apparatus shown in FIG. 9.
Figure 11:
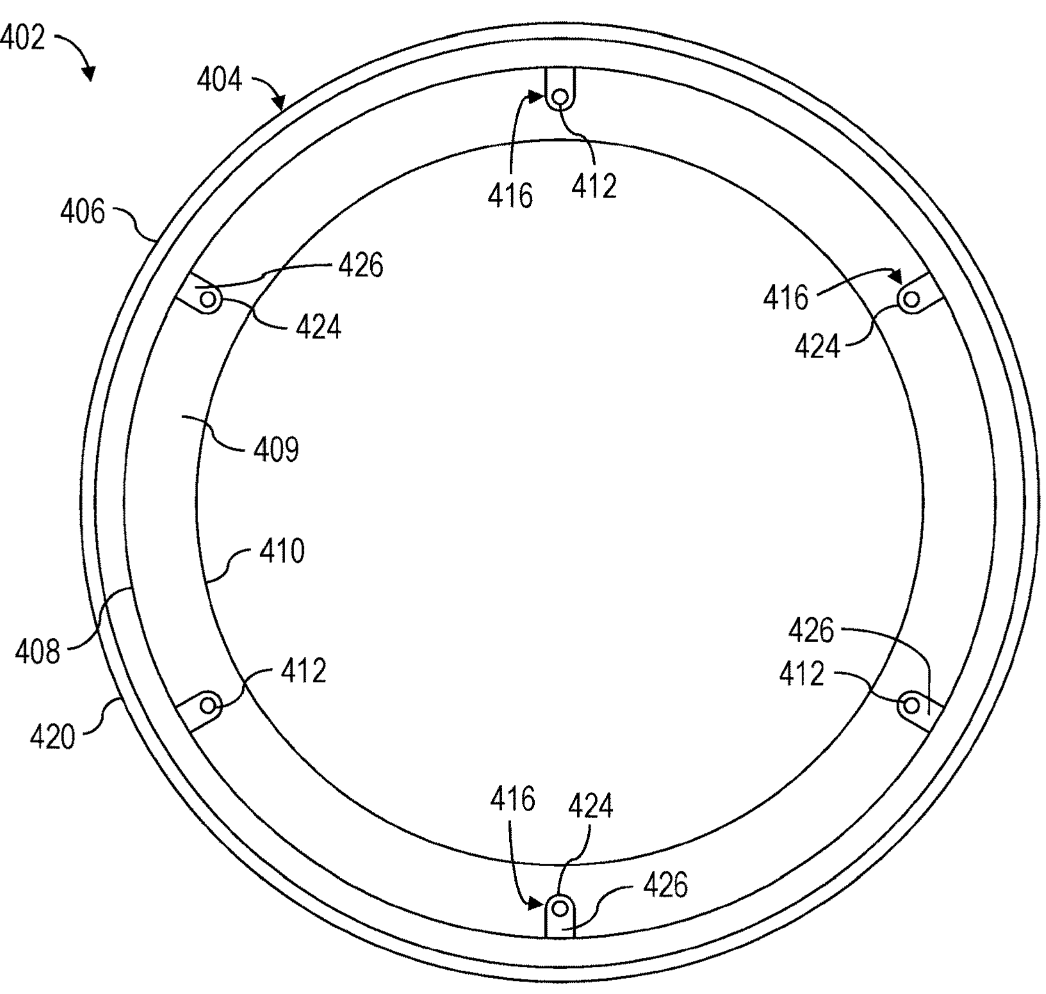
FIG. 11 is an axial view of the apparatus shown in FIGS. 9 and 10.

FIGS. 9-11 are sectional perspective, side sectional, and axial views, respectively, of an end fitting 404 of an example implementation of a packer assembly 402 according to one or more aspects of the present disclosure. The packer assembly 402 may comprise one or more features and/or modes of operation of the packer assemblies 112, 202, 204, 206, 208, 302 shown in FIGS. 1-8.

As shown in FIGS. 9 and 10, the end fitting 404 may comprise an external body 406 (e.g., an injection skirt) disposed around an internal body (not shown) and connected to an end connector (not shown) of the end fitting 404. The external body 406 may comprise an outer surface 408 comprising ribbed members (e.g., barbs or teeth) configured to grip or otherwise connect to an expandable external member (e.g., elastic sleeve) (not shown) of a packer body, an inner surface 410 of the packer body configured to contact and/or compress expandable inner members (e.g., elastomeric packer elements) (not shown) against an inner body of the end fitting 404, and an intermediate surface 409 extending between the inner and outer surfaces 408, 410 and located between the expandable inner and expandable external members of the packer body.

As further shown in FIGS. 9 and 10, the external body 406 may comprise a bore 412 extending diagonally (i.e., longitudinally and radially) therethrough. The bore 412 may accommodate therethrough a plurality of conductors 414 (e.g., a cable) for electrically connecting to a sensor (not shown) for monitoring (or measuring) deformation of the expandable internal member of the packer body, such as when the packer body is inflated to seal the wellbore interval 140 and when the interval 140 is pressurized. The conductors 414 may electrically and communicatively connect the sensor with an electronic acquisition module (not shown). The bore 412 may comprise an inner opening 416 extending through the intermediate surface 409 and located between the external and inner expandable members of the packer body.

The opening 416 may thereby connect the bore 412 with a space interior of the packer body and/or the end fitting 404, thereby facilitating electrical connection between the electronic acquisition module and the sensor without forming a hole through one or more of the external and inner expandable members. The bore 412 may also comprise an outer opening 418 that is located at an outer surface 420 of the external body 406. At the outer opening 418, the bore 412 may be connected to a channel 422 (e.g., a groove) extending longitudinally (or axially) along the outer surface 420. The channel 422 may accommodate the conductors 414 such that the conductors 414 do not extend radially outward past the outer surface 420, thereby protecting the conductors 414 from contacting the sidewall of the wellbore 102 or other objects within the wellbore 102 while the packer assembly 402 is conveyed within the wellbore 102. A portion of the bore 412 defining the inner opening 416 may be flared (i.e., progressively expand) 424 thereby permitting a portion of the conductors 414 located within the flared portion 424 of the bore 412 to move radially with respect to a longitudinal axis of the bore 412. The flared portion 424 (e.g., slot) of the bore 412 may be or comprise a cavity in the intermediate surface 409 having an inner diameter that is substantially larger than an inner diameter of the bore 412. The flared portion 424 of the bore 412 may be defined by a curved inner surface 426 extending to the outer surface 408. The flared section 424 may facilitate limited two-dimensional freedom of movement, including radially and circumferentially with respect to a central axis of the packer assembly 402, such as to prevent or inhibit tension from being imparted to the conductors 414 when the packer body 210 is inflated to seal the wellbore interval 140 and when the interval 140 is pressurized. The curved inner surface 426 may permit the conductors 414 to bend in a radially outward direction along the curved inner surface 426, thereby preventing or inhibiting the conductors 414 from being kinked when the conductors 414 are pulled in the radially outward direction when the packer body 210 is inflated. The flared portion 424 may comprise an oval profile, having a depth of about ten millimeters (mm) in a direction parallel to a longitudinal axis of the inflatable packer assembly 402, a minor width of about two mm in a direction perpendicular to the depth, and a major width of about six mm in a direction perpendicular to both of the depth and the minor width.

As shown in FIG. 11, the external body 406 may comprise a plurality of bores 412 and corresponding openings 416 in the intermediate surface 409. A portion of each bore 412 defining the inner opening 416 may be flared 424 thereby permitting a portion of the conductors 414 located within the flared portion 424 of the bore 412 to move radially with respect to the longitudinal axis of the bore 412. The bores 412 (and the openings 416) may be distributed circumferentially around a central axis of the packer assembly 402. As further shown in FIG. 11, the flared portion 424 of the bore 412 may be defined by the curved inner surface 426 extending to the outer surface 408.

Figure 12:
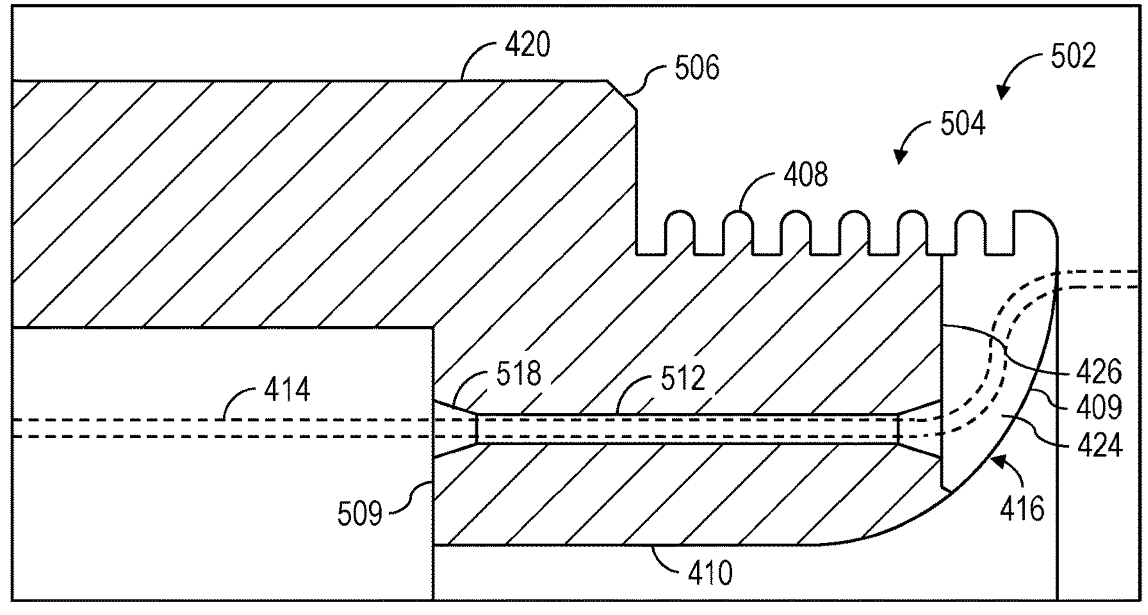
FIG. 12 is a side sectional view of a portion of apparatus according to one or more aspects of the present disclosure.

FIG. 12 is a side sectional view of an end fitting 504 of an example implementation of a packer assembly 502 according to one or more aspects of the present disclosure. The packer assembly 502 may comprise one or more features and/or modes of operation of the packer assembly 402 shown in FIGS. 9-11, including where indicated by the same reference numerals. Accordingly, the following description refers to FIGS. 1-3 and 9-12, collectively.

The end fitting 504 may comprise an external body 506 (e.g., an injection skirt) disposed around an internal body (not shown) and connected to an end connector (not shown) of the end fitting 504. The external body 506 may comprise an outer surface 408 comprising barbs or teeth configured to connect to an expandable external member (e.g., elastic sleeve) (not shown) of a packer body, an inner surface 410 of the packer body configured to contact and/or compress expandable inner members (e.g., elastomeric packer elements) (not shown) against an inner body of the end fitting 404, and an intermediate surface 409 extending between the inner and outer surfaces 408, 410 and located between the expandable inner and expandable external members of the packer body.

The external body 506 may comprise a bore 512 extending longitudinally (or axially) therethrough between the intermediate surface 409 and an inner surface 509 of the external body 506. The bore 512 may accommodate therethrough a plurality of conductors 414 (e.g., a cable) for electrically connecting to a sensor (not shown) for monitoring (or measuring) deformation of the expandable internal member of the packer body, such as when the packer body is inflated to seal the wellbore interval 140 and when the interval 140 is pressurized. The conductors 414 may electrically and communicatively connect the sensor with an electronic acquisition module (not shown). The bore 512 may comprise an inner opening 416 extending through the intermediate surface 409 and located between the external and inner expandable members of the packer body. The bore

512 may also comprise another opening 518 that is located on the inner surface 509 of the external body 506. Thus, the conductors 414 may extend through the entire external body 506 without being disposed or extending out of the external body 506 into an external space outside of the external body 506, thereby protecting the conductors 414 from contacting the sidewall of the wellbore 102 or other objects within the wellbore 102 while the packer assembly 502 is conveyed within the wellbore 102.

In view of the entirety of the present disclosure, including the figures and the claims, a person having ordinary skill in the art will readily recognize that the present disclosure introduces an inflatable packer assembly comprising: opposing end fittings by which the inflatable packer assembly is installable within a downhole tool string; an inflatable body coupled between the end fittings and having an external groove; and an elongation sensor fixed in the external groove, wherein the elongation sensor comprises a capacitive element that whose capacitance varies based on elongation of the elongation sensor in response to inflation of the inflatable body.

A signal output by the elongation sensor may be indicative of an electrical capacitance that is dependent on elongation and contraction of the elongation sensor corresponding to a respective amount of inflation and deflation of the inflatable body.

The elongation sensor may comprise an elastomeric body in which the capacitive element is encapsulated.

The external groove may extend circumferentially or helically around the inflatable body.

The elongation sensor may be one of a plurality of elongation sensors each fixed in the external groove.

The external groove may be one of a plurality of external grooves in the inflatable body, and the elongation sensor may be one of a plurality of elongation sensors each fixed in one of the external grooves. At least one of the external grooves may contain at least two of the elongation sensors.

The inflatable packer assembly may further comprise an elastomeric sleeve surrounding the inflatable body, the elongation sensor, and at least a portion of each end fitting.

The inflatable body may comprise: a plurality of concentric elastomeric layers, wherein the external groove is formed in an outermost one or more of the elastomeric layers, and wherein an electrical cable communicatively connected to the elongation sensor is recessed within the external groove; and an elastomeric sleeve surrounding the elastomeric layers. One of the end fittings may comprise: a ribbed end structure engaged by an axial end of the elastomeric sleeve; and a flared portion through which the electrical cable extends. The flared portion may have an oval profile having a depth of ten millimeters in a direction parallel to a longitudinal axis of the inflatable packer assembly, a minor width of two millimeters in a direction perpendicular to the depth, and a major width of six millimeters in a direction perpendicular to both of the depth and the minor width. The end fitting comprising the flared portion may comprise a passageway through which the electrical cable extends from the flared portion to an interior, and perhaps an exterior, of that end fitting.

The present disclosure also introduces a method of manufacturing an inflatable packer assembly, wherein the method comprises fixedly installing an elongation sensor in an external groove of an inflatable body, wherein the inflatable body is for coupling between (or is already coupled between) opposing end fittings by which the inflatable packer assembly is installable within a downhole tool string, and wherein the elongation sensor comprises a capacitive element that whose capacitance varies based on elongation of the elongation sensor in response to inflation of the inflatable body. Fixedly installing the elongation sensor in the external groove may utilize epoxy, cement, and/or other mechanical and/or chemical means.

The method may further comprise, prior to fixedly installing the elongation sensor in the external groove, forming the external groove circumferentially or helically around the inflatable body. Forming the external groove may comprise removing material from an external surface of the inflatable body by mechanical, chemical, and/or other means.

The external groove may be one of a plurality of external grooves in the inflatable body, the elongation sensor may be one of a plurality of elongation sensors, and fixedly installing the elongation sensor may comprise fixedly installing each of the plurality of elongation sensors in one of the external grooves. Fixedly installing each of the elongation sensors may comprise fixedly installing at least two of the elongation sensors in one of the external grooves.

The method may further comprise attaching an elastomeric sleeve surrounding the inflatable body, the elongation sensor, and at least a portion of each end fitting.

The inflatable body may comprise: a plurality of concentric elastomeric layers, wherein the external groove is formed in an outermost one or more of the elastomeric layers, and wherein an electrical cable communicatively connected to the elongation sensor is recessed within the external groove; and an elastomeric sleeve surrounding the elastomeric layers. One of the end fittings may comprise: a ribbed end structure engaged by an axial end of the elastomeric sleeve; and a flared portion through which the electrical cable extends. The end fitting comprising the flared portion may comprise a passageway through which the electrical cable extends from the flared portion to an interior (and perhaps an exterior) of that end fitting.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to comply with 37 C.F. R. § 1.72(b) to permit the reader to quickly ascertain the nature of the technical disclosure. It is submitted with the understanding that it will not be used to interpret or limit the scope or meaning of the claims.

What is claimed is:

1. An inflatable packer assembly comprising:

opposing end fittings by which the inflatable packer assembly is installable within a downhole tool string;

an inflatable body coupled between the end fittings and having an external groove, wherein the external groove extends circumferentially around the inflatable body; and an elongation sensor fixed in the external groove, wherein the elongation sensor comprises a capacitive element whose capacitance varies based on elongation of the elongation sensor in response to inflation of the inflatable body.

2. The inflatable packer assembly of claim 1 wherein a signal output by the elongation sensor is indicative of an electrical capacitance that is dependent on elongation and contraction of the elongation sensor corresponding to a respective amount of inflation and deflation of the inflatable body.

3. The inflatable packer assembly of claim 1 wherein the elongation sensor comprises an elastomeric body in which the capacitive element is encapsulated.

4. The inflatable packer assembly of claim 1 wherein the elongation sensor is one of a plurality of elongation sensors each fixed in the external groove.

5. The inflatable packer assembly of claim 1 wherein:
the external groove is one of a plurality of external grooves in the inflatable body; and
the elongation sensor is one of a plurality of elongation sensors each fixed in one of the external grooves.

6. The inflatable packer assembly of claim 5 wherein at least one of the external grooves contains at least two of the elongation sensors.

7. The inflatable packer assembly of claim 1 further comprising an elastomeric sleeve surrounding the inflatable body, the elongation sensor, and at least a portion of each end fitting.

8. The inflatable packer assembly of claim 1 wherein:
the inflatable body comprises:
a plurality of concentric elastomeric layers, wherein the external groove is formed in an outermost one or more of the elastomeric layers, and wherein an electrical cable communicatively connected to the elongation sensor is recessed within the external groove; and
an elastomeric sleeve surrounding the elastomeric layers; and
one of the end fittings comprises:
a ribbed end structure engaged by an axial end of the elastomeric sleeve; and
a flared portion through which the electrical cable extends.

9. The inflatable packer assembly of claim 8 wherein the flared portion has an oval profile having a depth of ten millimeters in a direction parallel to a longitudinal axis of the inflatable packer assembly, a minor width of two millimeters in a direction perpendicular to the depth, and a major width of six millimeters in a direction perpendicular to both of the depth and the minor width.

10. The inflatable packer assembly of claim 8 wherein the end fitting comprising the flared portion comprises a passageway through which the electrical cable extends from the flared portion to an interior of that end fitting.

11. The inflatable packer assembly of claim 8 wherein the end fitting comprising the flared portion comprises a passageway through which the electrical cable extends from the flared portion to an exterior of that end fitting.

12. An inflatable packer assembly comprising:
opposing end fittings by which the inflatable packer assembly is installable within a downhole tool string;
an inflatable body coupled between the end fittings and having an external groove;
an elongation sensor fixed in the external groove, wherein the elongation sensor comprises a capacitive element whose capacitance varies based on elongation of the elongation sensor in response to inflation of the inflatable body; and
an elastomeric sleeve surrounding the inflatable body, the elongation sensor, and at least a portion of each end fitting.

13. The inflatable packer assembly of claim 12 wherein:
the inflatable body comprises a plurality of concentric elastomeric layers, wherein the external groove is formed in an outermost one or more of the elastomeric layers, and wherein an electrical cable communicatively connected to the elongation sensor is recessed within the external groove; and
one of the end fittings comprises:
a ribbed end structure engaged by an axial end of the elastomeric sleeve; and
a flared portion through which the electrical cable extends.

14. The inflatable packer assembly of claim 13 wherein the flared portion has an oval profile having a depth of ten millimeters in a direction parallel to a longitudinal axis of the inflatable packer assembly, a minor width of two millimeters in a direction perpendicular to the depth, and a major width of six millimeters in a direction perpendicular to both of the depth and the minor width.

15. The inflatable packer assembly of claim 13 wherein the end fitting comprising the flared portion comprises a passageway through which the electrical cable extends from the flared portion to an interior of that end fitting.

16. The inflatable packer assembly of claim 13 wherein the end fitting comprising the flared portion comprises a passageway through which the electrical cable extends from the flared portion to an exterior of that end fitting.

17. The inflatable packer assembly of claim 12 wherein a signal output by the elongation sensor is indicative of an electrical capacitance that is dependent on elongation and contraction of the elongation sensor corresponding to a respective amount of inflation and deflation of the inflatable body.

18. An inflatable packer assembly comprising:
opposing end fittings by which the inflatable packer assembly is installable within a downhole tool string;
an inflatable body coupled between the end fittings and having an external groove; and
an elongation sensor fixed in the external groove, wherein the elongation sensor comprises a capacitive element whose capacitance varies based on elongation of the elongation sensor in response to inflation of the inflatable body, and wherein the elongation sensor is one of a plurality of elongation sensors each fixed in the external groove.

19. The inflatable packer assembly of claim 18 wherein a signal output by the elongation sensor is indicative of an electrical capacitance that is dependent on elongation and contraction of the elongation sensor corresponding to a respective amount of inflation and deflation of the inflatable body.

20. The inflatable packer assembly of claim 18 wherein the elongation sensor comprises an elastomeric body in which the capacitive element is encapsulated.

* * * * *